(12) United States Patent
Iwai et al.

(10) Patent No.: US 6,559,565 B2
(45) Date of Patent: May 6, 2003

(54) MOTOR APPARATUS

(75) Inventors: Hiroshi Iwai, Fujieda (JP); Takeshi Suzuki, Kakegawa (JP)

(73) Assignee: Victor Company of Japan, Ltd., Yokohama (JP)

( * ) Notice: Subject to any disclaimer, the term of this patent is extended or adjusted under 35 U.S.C. 154(b) by 0 days.

(21) Appl. No.: 10/085,621

(22) Filed: Mar. 1, 2002

(65) Prior Publication Data
US 2002/0153786 A1 Oct. 24, 2002

(30) Foreign Application Priority Data
Mar. 2, 2001 (JP) .......................................... 2001-057934

(51) Int. Cl.$^7$ ................................................. H02K 11/00
(52) U.S. Cl. ................. 310/68 B; 310/268; 310/DIG. 3
(58) Field of Search ................................ 310/68 B, 51, 310/268, DIG. 3, 68 R, 156.01; 318/254

(56) References Cited
U.S. PATENT DOCUMENTS 4,631,459 A * 12/1986 Fujioka et al. .............. 318/254
4,912,379 A    3/1990 Matsuda et al.
5,124,604 A * 6/1992 Swartz ...................... 310/68 B
5,498,919 A * 3/1996 Bahn .......................... 310/268
6,144,126 A * 11/2000 Kodama ..................... 310/68 B

FOREIGN PATENT DOCUMENTS

JP          5-184108        7/1993
JP          2000-175425     6/2000

* cited by examiner

Primary Examiner—Thanh Lam
(74) Attorney, Agent, or Firm—Connolly Bove Lodge & Hutz LLP (57) ABSTRACT

A motor apparatus having a rotor placed rotatably on a stator base, and providing a FG signal for controlling the rotation of the rotor. The motor apparatus further includes driving magnet for having a plurality of magnetic poles placed on the outer circumference of the rotor and having a magnetic flux density pattern magnetized either third or fifth harmonic component, and FG coil provided on the circumference of the rotor in the position opposing to the magnetic pole for driving magnet, for supplying the FG signal by occurrence of an electric signal for magnetomotive force in the magnetic field. The driving magnet of the motor apparatus is having a magnetic flux density which reaches to the FG coil within the range of 0.2 to 0.6 T (Tesla) so that inequable rotation of the motor can be suppressed.

2 Claims, 6 Drawing Sheets

MOTOR APPARATUS

BACKGROUND OF THE INVENTION

1. Field of Invention

The present invention relates to a motor apparatus preferable for use in a flexible disk drive, having a structure of a frequency generator which outputs a FG signal for detecting a rotational velocity of a spindle, and particularly relates to a motor apparatus being compact in size and having high controllability and high noise resistance.

2. Description of Related Art

Figure 7A:
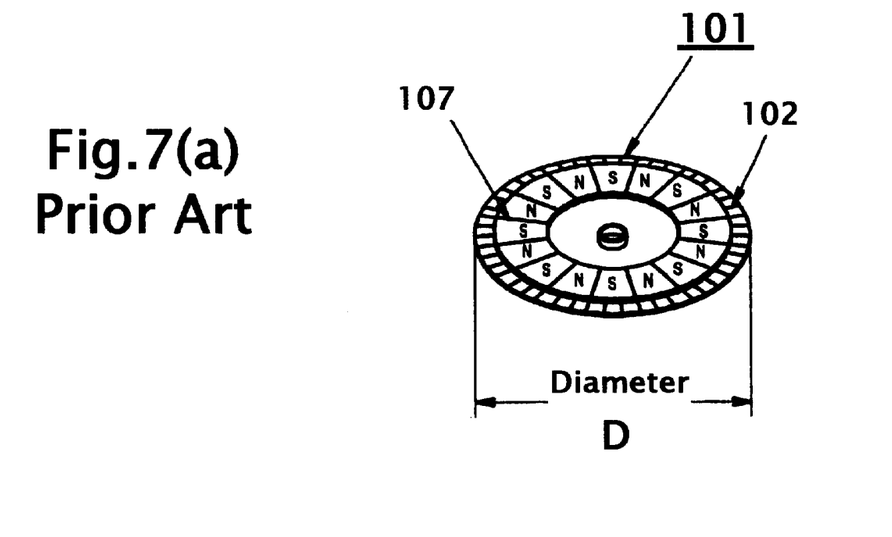
FIGS. 7(a) and (b) are perspective views of a motor apparatus according to the prior art.
Figure 7B:
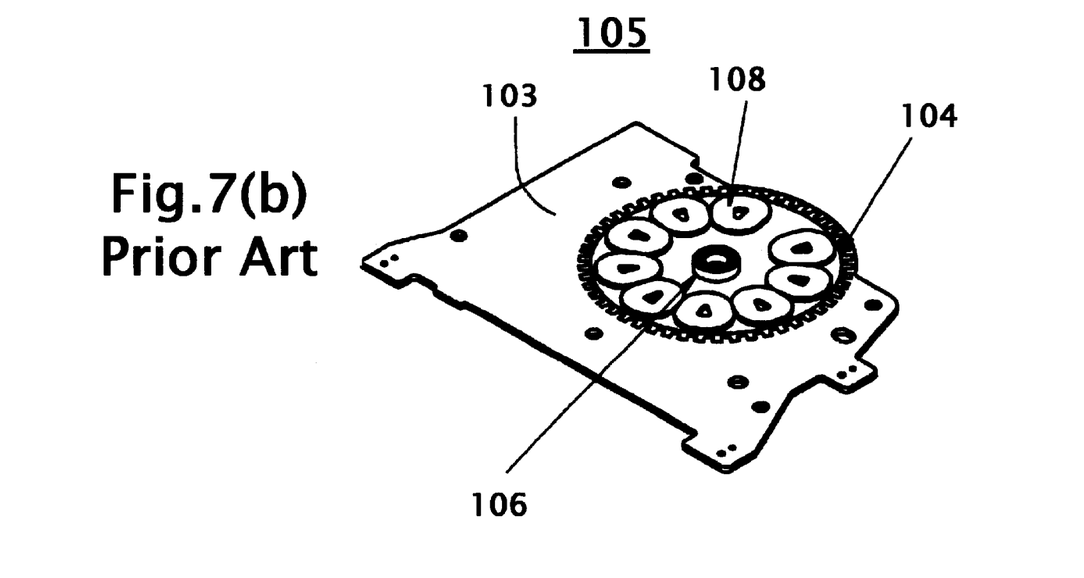

FIGS. 7(a) and 7(b) are perspective views of a motor apparatus having a frequency generator for detecting a rotational velocity of a spindle in accordance with the related art. Such the motor apparatus is used for a flexible disk drive having a spindle being a rotating shaft of the motor, which is so called a direct drive structure.

FIG. 7(a) shows a perspective view of a rotor portion of a motor apparatus. A circle shaped rotor 101 having a diameter "D" includes a FG magnet 102 placed on the outer circumference of the rotor 101. The FG magnet 102 is formed by mixing magnetic powder with nylon resin (so called "plastic magnet") and having residual flux density "Br" of 0.18 T (Tesla).

Figure 8:
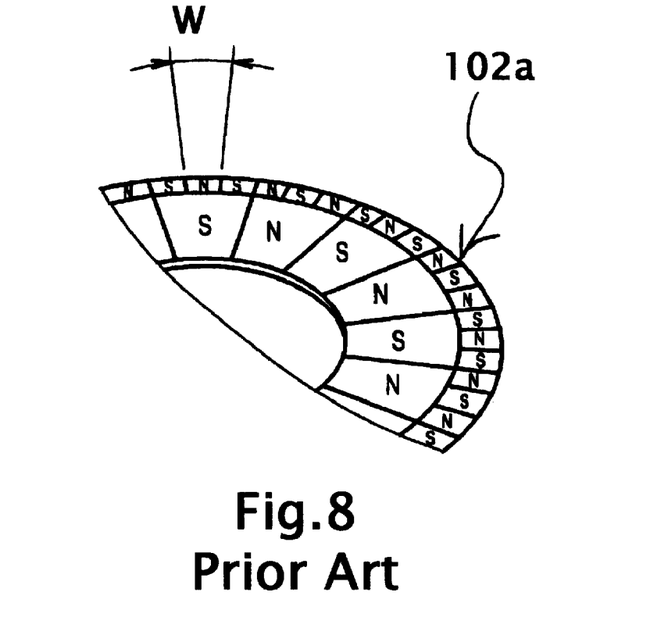
FIG. 8 is an enlarged partial view of a rotor of the motor apparatus according to the related art.
Figure 9:
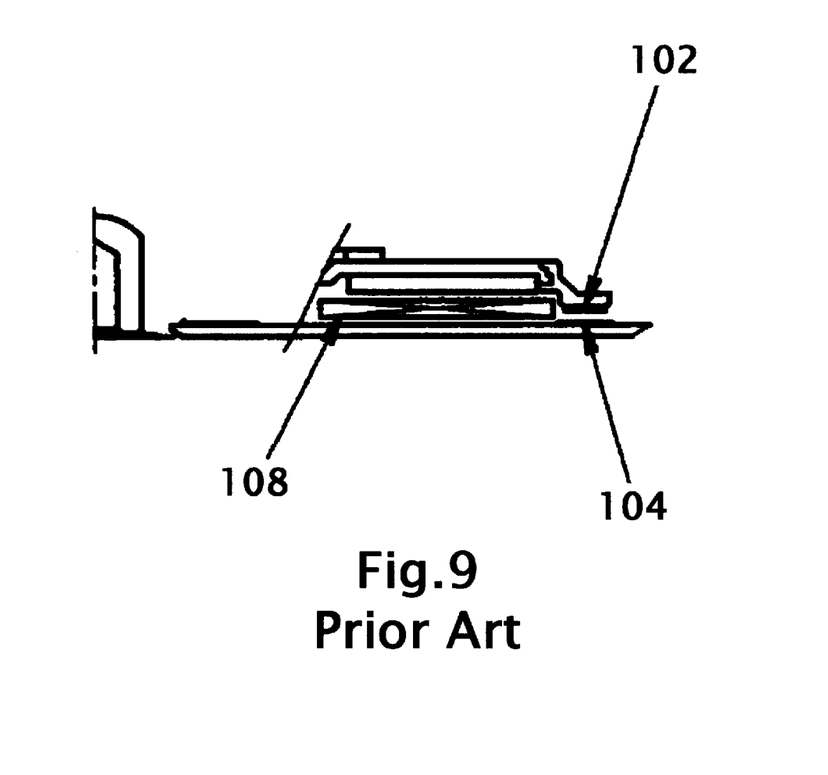
FIG. 9 is a side view of the motor apparatus according to the prior art.

FIG. 8 shows an enlarged view of a rotor shown in FIG. 7(a). FIG. 9 shows a side view of a motor apparatus. In FIG. 8, forty-eight (48) magnetic poles of FG magnetic pole 102a are provided on the rotor 101 in radial direction thereof. The diameter "D" of the rotor 101 in this case is 46 mm and a pitch "W" of the magnetic pole is 3 mm (π·46/48=3).

FIG. 7(b) shows a stator of the motor apparatus. A stator 105 includes a stator base 103, a FG coil 104, a driving coil 108 and a shaft bearing 106. The FG coil 104 is placed on the circumference of the circle of which center is the shaft bearing 106. The stator base 103 is formed with a copper foiled printed circuit board through an insulative layer laminated over a base plate of soft magnetic material such as cold rolling iron and silicon steel. The FG coil 104 has a folded pattern with a folded pitch of 7.5° (360/48=7.5) and opposing to the magnetic pole of the plastic magnet described above.

In FIGS. 7(a) and 7(b), a rotating shaft not shown is fixed in the center of the rotor 101, and is supported by the shaft bearing 106 at the center of the stator 105, and the FG magnet 102 opposes to the FG coil 104 with a gap "G" of 2 mm.

As the magnetic flux of the FG magnetic pole 102a shown in FIG. 8 interlinks to the FG coil 104, an FG signal is generated in the FG coil 104 by rotation of the rotor 104 in accordance with the Fleming's rule. The frequency of the FG signal is in proportion of the rotational velocity. The structure described above constitutes a frequency generator.

The rotor 101 has disciform driving magnet (field magnet) 107 having sixteen (16) field magnetic poles, and the stator 105 has nine (9) driving coils 108 respectively. The rotational magnetic field occurs in the driving coil 107 by passing driving current through the driving circuit not shown, then the rotational force for the rotor 101 occurs by the interaction with field magnetic pole formed by the driving magnet 107.

The FG signal described above is converted to a voltage commensurate to the frequency by velocity controlling circuit not shown, and the converted voltage is given feedback to the driving circuit to control the rotational velocity of the motor constant.

However, the motor apparatus described above has following problems.

(1) The motor apparatus has problem of rotational control that the generated FG signal is very weak. Actually, the magnetic flux generated by the FG magnetic pole 102a reaches to the FG coil 104 for only 0.02 T. Accordingly, the magnetic flux leaked from the driving coil 108 adversely impact the magnetic flux of the FG coil 104.

The magnetic flux leaked from the driving coil 108 causes noise in the output of FG signal when it interlinks to the FG coil. Consequently, the velocity controlling circuit can not operate properly and the rotation of the motor fluctuates. Eventually, the rotation of the disk drive adversely impact the read-out/write-on operation of the flexible disk drive.

(2) The motor apparatus has disadvantage in miniaturization. The FG coil 104 and the driving coil 108 should be kept away from each other to suppress the impact of magnetic flux leaked from the driving coil 108, which causes the size of the motor apparatus bigger.

If the FG coil 104 and the driving coil 108 are kept away in horizontal direction, the diameter of the motor apparatus becomes bigger, and if the coils are kept away in vertical direction, the thickness of the motor apparatus becomes thicker.

In either case, the motor apparatus can not be miniaturized and the flexible disk drive having such the motor apparatus can not be miniaturized and the final product incorporating such the flexible disk drive can not be miniaturized.

(3) The FG coil is influenced by leaked magnetic flux coming from outside. The FG coil 104 is placed in the outer circumference of the motor which position is most sensitive for any leaked magnetic flux coming from outside. Leaking of magnetic flux can be blocked by magnetic shield. However, the magnetic shield is costly and needs more room for installation.

SUMMARY OF THE INVENTION

Accordingly, in consideration of the above-mentioned problems of the related art, an object of the present invention is to provide a motor apparatus a motor apparatus having a rotor placed rotatably on a stator base and provided with an FG signal for controlling the rotation of the rotor, the motor apparatus including, a driving magnet having an even number of magnetic poles evenly placed on the outer circumference of the rotor, wherein the even number is not less than 12 and not more than 32, and having a magnetic flux density pattern superposed with an "n"th (n is either one of 3 and 5) harmonic component, wherein the driving magnet is made of Nd—Fe—B system material, and wherein a peak value of the magnetic flux density pattern of the driving magnet is in the range of 0.2 to 0.6 T (Tesla) in order to suppress rotational fluctuation caused by controlling the rotation of rotor within 5%, and an FG coil provided on the circumference of the stator base in the position opposing to each of the magnetic poles of the driving magnet with keeping a predetermined gap between the FG coil and the driving magnet, wherein the FG coil has a folding pattern of being folded alternately in the radial direction by a fold pitch angle of 1/n of a pitch angle of the driving magnet.

According to another aspect of the present invention, there provided a motor apparatus having a rotor placed rotatably on a stator base and provided with an FG signal for controlling the rotation of the rotor, the motor apparatus including, a driving magnet having an even number of magnetic poles evenly placed on the outer circumference of the rotor, wherein the even number is not less than 12 and not more than 32, and having a magnetic flux density pattern superposed with an "n"th (n is either one of 3 and 5) harmonic component, wherein the driving magnet is made of Nd—Fe—B system material, and an FG coil provided on the circumference of the stator base in the position opposing to each of the magnetic poles of the driving magnet with keeping a predetermined gap between the FG coil and the driving magnet, wherein the FG coil has a folding pattern of being folded alternately in the radial direction by a fold pitch angle of 1/n of a pitch angle of the driving magnet, the motor apparatus further satisfying an equation of $4 \leq \pi D/(PG) \leq 15$ in order to suppress rotational fluctuation caused by controlling the rotation of rotor within 5%, wherein $\pi$ is circular constant, D is a diameter of the driving magnet, P is a number of magnetic pole of the driving magnet, and G is a gap length between the driving magnet and the FG coil.

Other object and further features of the present invention will be apparent from the following detailed description when lead-in conjunction with the accompanying drawings.

BRIEF DESCRIPTION OF DRAWINGS

FIGS. 1(a) and (b) are perspective views of a motor apparatus according to an embodiment of the present invention.

DETAILED DESCRIPTION OF THE PREFERRED EMBODIMENTS

Figure 1:
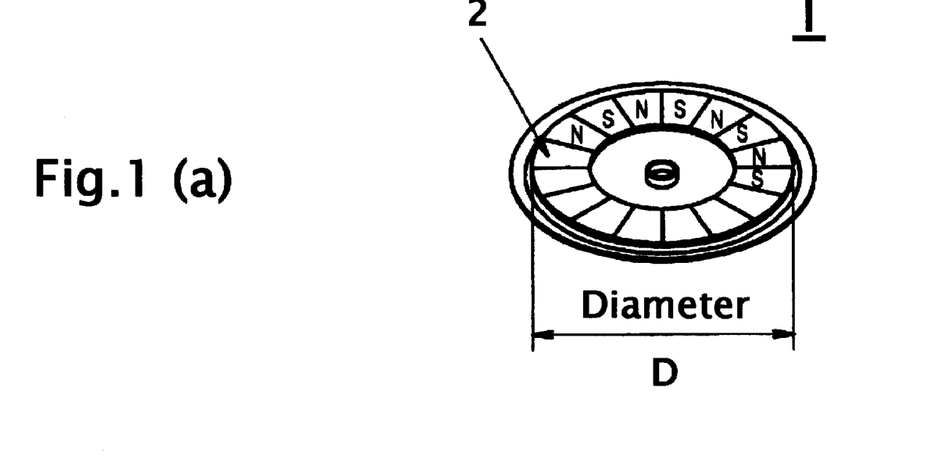
Figure 3:
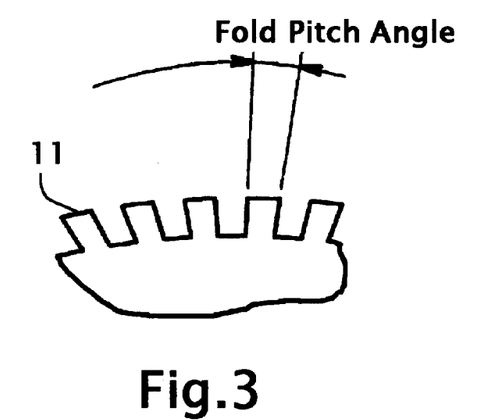
FIG. 3 is an enlarged partial view of a FG coil in accordance with the present invention.

FIGS. 1(a) and 1(b) show perspective views of a motor apparatus in accordance with the present invention. In FIG. 1(a), a circle shaped rotor 1 having a diameter "D" is composed of a field magnet 2. In FIG. 1(b), a stator 10 is composed of an FG coil 11, a stator base 13, a driving coil 12 and a shaft bearing 14. The FG coil 11 is placed on the circumference of which center is the shaft bearing 14. FIG. 3 shows that the FG coil 11 is having a folded pattern with a folded pitch angle of 7.5° ($360/(3\cdot16)=7.5$) and is placed between the driving coil 12 and the stator base 13.

Figure 2:
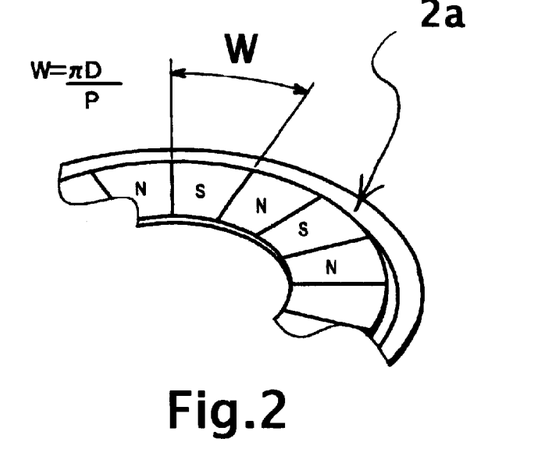
FIG. 2 is an enlarged partial view of a rotor in accordance with the present invention.

The field magnet 2 is used for both an FG magnet and a driving magnet. FIG. 2 shows an enlarged view of the rotor 1 having a driving magnetic pole 2a. The field magnet 2 is also used as an FG magnet that the FG magnetic pole is magnetized with a third harmonic component of the driving magnetic pole 2a having 16 poles.

Figure 4:
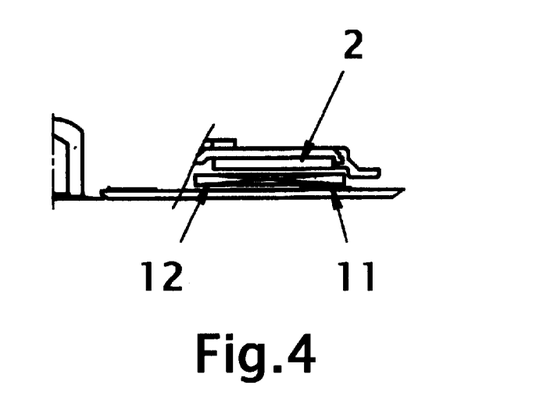
FIG. 4 is a side view of the motor apparatus in accordance with the present invention.

The magnetic pole pitch "W" in FIG. 2 is described as $W = \pi \cdot D/P$, wherein "D" is diameter of the rotor, and "P" is a number of poles. FIG. 3 is a partial enlarged view of the FG coil shown in FIG. 1(b). FIG. 4 is a cross-sectional view of the motor apparatus in accordance with the present invention.

Figure 5A:
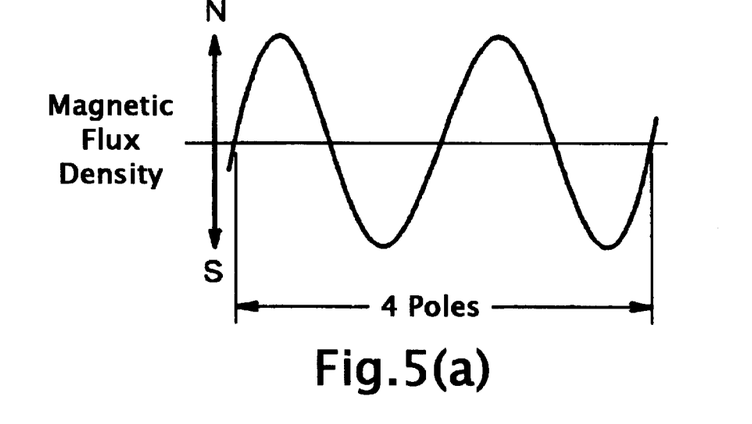
FIGS. 5(a) through (c) are diagram for explaining a magnetic flux density characteristic of the motor apparatus in accordance with the present invention.
Figure 5B:
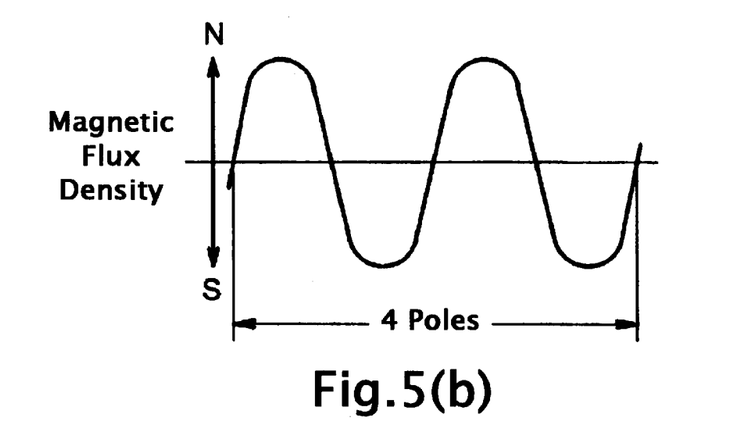
Figure 5C:
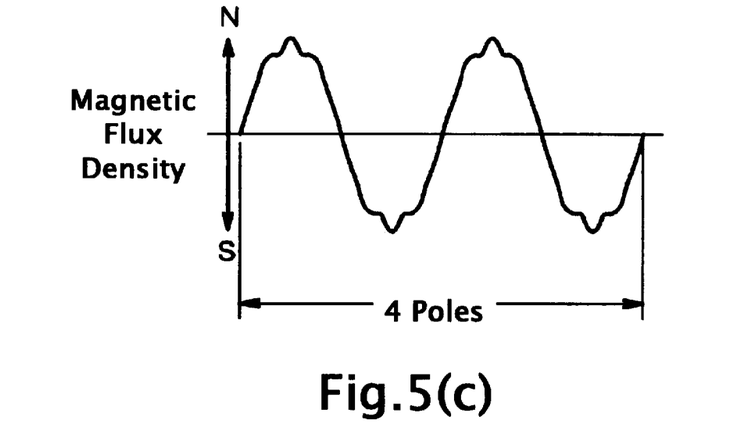

FIGS. 5(a) through (c) are diagram for explaining a magnetic flux density characteristic of the motor apparatus in accordance with the present invention.

As described below, the conventional field magnet has a magnetic flux density as shown in FIG. 5(a) (close to sine curve), but the field magnet being magnetized with a higher harmonic component provides a magnetic flux density as shown in FIG. 5(b).

In case that a superposed ratio of the third harmonic component is too low, then an output of the FG coil 11 becomes weaker and is adversely affected by a noise element. In case that the superposed ratio of the third harmonic component is too high, then a rotation torque of the driving coil 12 becomes inequable which may cause vibration or noise of the motor.

As to a result of inventors' study, the rotational wow and flutter is less than 5% when the superposed ratio of the third harmonic component is 7 to 35%, and is less than 3% when the superposed ratio of the third harmonic component is 10 to 25%.

The FG coil 11 may also have a fold pitch angle (which is described in FIG. 3) of 4.5° ($4.5=360/(16\cdot5)$). In this case, the FG magnetic pole is magnetized with a fifth harmonic component in 16 poles for driving magnetic pole which magnetic flux density is shown as in FIG. 5(c). The proportion of superposition for the fifth harmonic component is the same as in the case of the third harmonic component.

Below is the result of inventors' study of the number of magnetic poles.

In case of a spindle motor for flexible disk drive, the factor of rotational fluctuation is caused by a change of load torque of flexible disk drive and a jacket for covering the same. If the rotational fluctuation of the flexible disk drive becomes bigger, it causes trouble to read-out/write-in operation. In some cases, it may destroy data information. Accordingly, the rotational fluctuation should be kept 5% or less.

The change of load torque tends to repeat once in every rotation of the flexible disk. In case that the flexible disk rotates 5 times per second (5 r/s)(equals to 300 r/m), the load torque is 5 Hz in frequency. Considering the time loss of FG signal, the FG frequency F should be more than 16 times the load torque, which is 80 Hz ($80=(5\cdot16)$) to decrease a velocity movement of the rotational fluctuation corresponding to the change of load torque. Accordingly, the number of poles "P" for the basic wave is described as follows:

$$P > (2 \cdot F)/(n \cdot 3) = (2 \cdot 80)/(5 \cdot 3) = 10.67$$

In this sense, the number of poles "P" should be more than 12.

In this connection, if the number of poles "P" becomes bigger, the superposition of the third or fifth harmonic component becomes difficult. However, the inventors of the present invention confirm that the number of poles can be up to 32 poles for superposition.

Then the result of study for the fold pitch angle of the FG coil is explained next.

In a case that the field magnet 2 having 16 magnetic poles is superposed by an FG magnetic pole having 48 magnetic poles, almost no FG signal can be obtained unless the fold pitch angle of the FG coil 11 is 7.5 degrees (calculated by 360/48).

In other words, if the field magnet 2 is superposed by the FG magnetic pole for the third harmonic component, the fold pitch angle of FG coil should be 120/P degrees or otherwise the spindle motor for the flexible disk can not operate properly.

Further, the field magnet having 16 magnetic poles is superposed by the FG magnetic pole having 80 magnetic poles, the fold pitch angle of the FG coil 11 should be 360/80, which is 4.5 degrees or otherwise no FG signal is obtained. Accordingly, the fold pitch angle for the FG coil 11 should be 72/P when the field magnet is superposed by the fifth harmonic component otherwise the spindle motor for the flexible disk can not operate properly.

Then the result of study for the magnetic flux caused by the driving coil 12 is explained next.

One driving coil 12 is wound in 80 turns. The magnetomotive force is 16 AT (ampere-turn) when the current is 0.2 A (ampere) at steady-state of rotation. It is obvious from the form of magnetic circuit that the magnetic flux density occurred from one driving coil is 0.02 T.

In the case of present embodiment, the magnetic flux density leaking from the driving coil 12 to the FG coil 11 is considered to be approximately 0.02 T because the FG coil 11 closely contacts the driving coil 12. To ensure the functional requirements of frequency generator, the magnetic flux density reaching the FG coil 11 from magnetic pole 2a should sufficiently be bigger than the leaking magnetic flux density.

As to the result of inventors' study, the rotational fluctuation and the peak value of the magnetic flux density reaching the FG coil 11 for the flexible disk are obtained as Table 1 below. The rotational fluctuation of less than 5% is obtained when the peak value of the magnetic flux density is more than 0.2 T. Further, the rotational fluctuation of less than 3% is obtained when the peak value of the magnetic flux density is more than 0.3 T. Thus the flexible disk drive can operate smoothly even when the recording density becomes higher and can apply to increase of the recording capacity.

TABLE 1

| Magnetic Flux Density (Tesla) | 0.1 | 0.2 | 0.3 | 0.4 | 0.5 |
|---|---|---|---|---|---|
| Rotational Fluctuation (%) | 10.0 | 5.0 | 3.0 | 2.8 | 2.8 |

In the case that the peak value of the magnetic flux density exceeds 0.6 T, the magnetic attraction between the stator base 13 and the driving magnet 2 becomes so excessive that the driving coil 12 and the driving magnet 2 stick with each other and motor will not rotate. To prevent this, the stator base 13 should be thicker but it makes the motor apparatus even more thicker.

Then the result of study for the relation between the diameter "D" of the rotor 1, a number of poles "P" of the magnet pole 2a, and a gap "G" between the field magnet 2 and the FG coil 11 is explained next.

The magnetic pole pitch "W" is described as follows in view of geometric relation.

$W = \pi D/P$

When the magnetic pole pitch "W" becomes bigger, the magnetic flux density reaching the FG coil 11 becomes higher, and the density becomes lesser when the gap "G" becomes bigger. Thus, the magnetic flux density reaching the FG coil 11 is determined by the values of $W/G = \pi D/(PG)$ and residual flux density Br for the field magnet 2.

In a case that the field magnet 2 is composed of a material having a magnetic flux density "Br" of 1.2 T such as Nd, Fe, and B, according to an experiment, the magnetic flux density of the driving magnetic pole 2a reaching the FG coil 11 is always more than 0.2 T when the value of $\pi CD/PG$ is more than 4.

In this sense, if the value of $\pi D/PG$ is less than 4, the material for the field magnet 2 should have the magnetic flux density Br greater than 1.2 T. However, any material having such a characteristic requires higher manufacturing cost and is difficult to magnetize. Accordingly, it is difficult to utilize for a motor apparatus equipped with a frequency generator.

As to the field magnet 2 composed of a material having Br of 1.0 T, the magnetic flux density reaching the FG coil 11 becomes over 0.2 T when $\pi D/PG$ is more than or equal to 6. As to the field magnet 2 composed of a material having Br of 0.8 T, the magnetic flux density reaching the FG coil becomes over 0.2 T when $\pi D/PG$ is more than or equal to 8.

As to a method for superposing a third harmonic component can be conducted by firstly magnetize basic wave element having 16 poles and then magnetize the third harmonic component having 48 poles.

Figure 6:
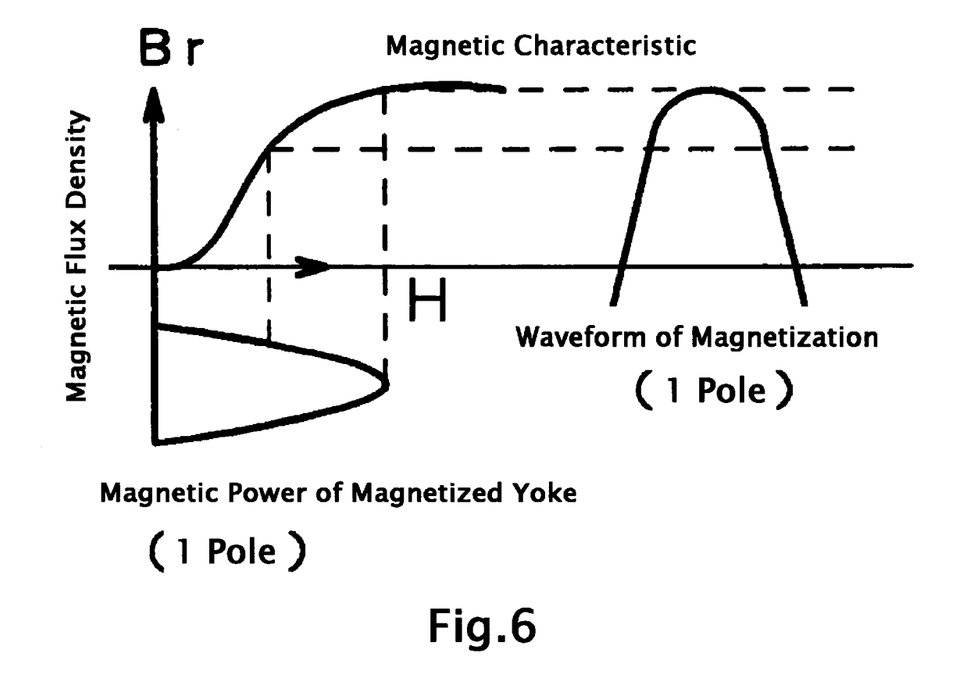
FIG. 6 is a diagram for explaining a magnetization characteristic of the motor apparatus in accordance with the present invention.

In this connection, the magnetization can also be conducted by using a magnetizing yoke having a magnetomotive force of 16 poles and a magnetomotive force of 48 poles in one piece. As shown in FIG. 6, the magnetization of the third harmonic component having 48 poles can be conducted by magnetizing 16 poles with double power of a coercive force Hc. The center portion of the magnetic pole saturates by the magnetic characteristic, and practically provides superposition of the third harmonic component having 48 poles.

As to a method for superposing a fifth harmonic component, as described above, the superposition can be conducted by magnetizing basic wave component having 16 poles and then superpose the fifth harmonic component having 80 poles, and by using a magnetizing yoke having a magnetomotive force of 80 poles.

When using the material inexpensive and easy for magnetizing having a magnetic flux density "Br" of 1.2 T or less, the value of $\pi D/PG$ should be 4 or more to make the magnetic flux density reaching the FG coil to be 0.2 T or more. To the contrary, if the value $\pi D/PG$ becomes more than 15, the gap "G" becomes so small that the room for placing a driving coil also becomes smaller and the rotation torque decreases, but the assembly becomes finespun.

Generally, a magnetic material having high Br value has higher manufacturing cost. Accordingly, the material having the value of $\pi D/PG = 6$ or more is preferable. Further, the value of $\pi D/PG = 8$ or more is even more preferable.

As described above, the motor apparatus equipped with frequency generator in accordance with the present invention can obtain the magnetic flux density of 0.2 T at the FG coil 11 from the magnet pole 2a which is very high compare to the conventional motor apparatus. The FG coil 11 is not necessarily placed outside the driving coil 12 but relatively inside so that the impact of magnetic flux coming from outside can be suppressed.

As described above, the motor apparatus according to the present invention includes the driving magnet having even number of magnetic poles for 12 or more and 32 or less, and having a magnetic flux density pattern of superposing an nth ("n" is either 3 or 5) harmonic component. Then the motor apparatus includes the FG coil having fold pitch angle of 1/n ("n" is either 3 or 5) of the pitch angle of the driving magnet and being placed on the stator opposed to the driving magnet. Then the motor apparatus provides the FG signal corresponding to the magnetic flux density pattern of the driving magnet at the rotation of the rotor to control the rotational operation. The driving magnet is made of Nd—Fe—B (Neodymium-Iron-Boron) system material. In addition, the peak value of the magnetic flux density pattern of the driving magnet received by the FG coil is 0.2 to 0.6 T to suppress the rotational fluctuation of the rotation control of the motor within 5%. Accordingly, the motor apparatus is less influenced by the magnetic flux of the driving coil leaking to the FG coil, and it suppresses the rotational fluctuation caused by the influence of the other magnetic flux, so that the FG coil can be placed closely or contiguous to the driving coil to make the motor circuitry compact.

It is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

What is claimed is:

1. A motor apparatus having a rotor placed rotatably on a stator base and provided with an FG signal for controlling the rotation of the rotor, the motor apparatus comprising:

a driving magnet having an even number of magnetic poles evenly placed on the outer circumference of the rotor, wherein the even number is not less than 12 and not more than 32, and having a magnetic flux density pattern superposed with an "n"th (n is either one of 3 and 5) harmonic component, wherein the driving magnet is made of Nd—Fe—B system material, and wherein a peak value of the magnetic flux density pattern of the driving magnet is in the range of 0.2 to 0.6 T (Tesla) in order to suppress rotational fluctuation caused by controlling the rotation of rotor within 5%; and an FG coil provided on the circumference of the stator base in the position opposing to each of the magnetic poles of the driving magnet with keeping a predetermined gap between the FG coil and the driving magnet, wherein the FG coil has a folding pattern of being folded alternately in the radial direction by a fold pitch angle of 1/n of a pitch angle of the driving magnet.

2. A motor apparatus having a rotor placed rotatably on a stator base and provided with an FG signal for controlling the rotation of the rotor, the motor apparatus comprising:

a driving magnet having an even number of magnetic poles evenly placed on the outer circumference of the rotor, wherein the even number is not less than 12 and not more than 32, and having a magnetic flux density pattern superposed with an "n"th (n is either one of 3 and 5) harmonic component, wherein the driving magnet is made of Nd—Fe—B system material; and an FG coil provided on the circumference of the stator base in the position opposing to each of the magnetic poles of the driving magnet with keeping a predetermined gap between the FG coil and the driving magnet, wherein the FG coil has a folding pattern of being folded alternately in the radial direction by a fold pitch angle of 1/n of a pitch angle of the driving magnet, the motor apparatus further satisfying an equation of $4 \leq \pi D/(PG) \leq 15$ in order to suppress rotational fluctuation caused by controlling the rotation of rotor within 5%, wherein $\pi$ is circular constant, D is a diameter of the driving magnet, P is a number of magnetic pole of the driving magnet, and G is a gap length between the driving magnet and the FG coil.

* * * * *